United States Patent
Messenger

(10) Patent No.: US 11,354,370 B2
(45) Date of Patent: Jun. 7, 2022

(54) DETERMINING RELEVANCE OF ENTITIES IN SOCIAL MEDIA DATASETS

(71) Applicant: Runtime Collective Limited, Brighton (GB)

(72) Inventor: Philip Messenger, Brighton (GB)

(73) Assignee: Runtime Collective Limited, Brighton (GB)

( * ) Notice: Subject to any disclaimer, the term of this patent is extended or adjusted under 35 U.S.C. 154(b) by 510 days.

(21) Appl. No.: 16/363,677

(22) Filed: Mar. 25, 2019

(65) Prior Publication Data

US 2020/0311161 A1    Oct. 1, 2020

(51) Int. Cl.
*G06F 16/9536*    (2019.01)
*G06F 16/901*    (2019.01)
*G06F 16/906*    (2019.01)
*G06F 16/9538*    (2019.01)

(52) U.S. Cl.
CPC ........ *G06F 16/9536* (2019.01); *G06F 16/906* (2019.01); *G06F 16/9014* (2019.01); *G06F 16/9538* (2019.01)

(58) Field of Classification Search
CPC .............. G06F 16/9536; G06F 16/906; G06F 16/9014; G06F 16/9538; G06F 3/0641; G06Q 50/01
See application file for complete search history.

(56) References Cited

U.S. PATENT DOCUMENTS

| 2006/0064411 | A1* | 3/2006 | Gross ................ G06F 16/90324 |
| 2007/0192300 | A1* | 8/2007 | Reuther ............. G06F 16/2471 |
| 2008/0147641 | A1* | 6/2008 | Leffingwell ....... G06F 16/24578 |
| 2011/0184936 | A1* | 7/2011 | Lymberopoulos ......................... G06F 16/9574 707/721 |
| 2018/0101540 | A1* | 4/2018 | Stoop ................. G06F 16/7867 |

* cited by examiner

*Primary Examiner* — Robert W Beausoliel, Jr.
*Assistant Examiner* — Mohammad Solaiman Bhuyan
(74) *Attorney, Agent, or Firm* — Mintz Levin Cohn Ferris Glovsky and Popeo, P.C.

(57) ABSTRACT

Data characterizing a result set corresponding to a query of a social media dataset can be received. The query can include a first context including a first context identifier. The result set can include a first entity and a second entity. The first entity can include a first entity identifier and the second entity can include a second entity identifier. A key set can include a first fixed length key characterizing the first entity identifier in the first context. The key set can further include a second fixed length key characterizing the second entity identifier in the first context. The key set including the first fixed length key and the second fixed length key can be deduplicated. A first relevance score associated with the first context can be determined using the deduplicated key set. The first relevance score can be provided.

20 Claims, 5 Drawing Sheets

Sites

Sort by: Relevance

| Name | Site Description | ▼ Relevance | Volume |
|---|---|---|---|
| firstsite.com | Description of first site | 88 | 327 |
| secondsite.com | Description of second site | 82 | 133 |
| thirdsite.com | Description of third site | 81 | 295 |
| fourthsite.com | Description of fourth site | 78 | 156 |
| fifthsite.com | Description of fifth site | 75 | 49 |
| sixthsite.com | Description of sixth site | 71 | 35 |

*FIG. 4*

DETERMINING RELEVANCE OF ENTITIES IN SOCIAL MEDIA DATASETS

TECHNICAL FIELD

The subject matter described herein relates to determining relevance of entities in a social media dataset.

BACKGROUND

Social media networks can include vast amounts of data. Moreover, social networks can be dynamic with new interactions occurring and communities changing over even a short period of time. But the computational requirements to perform relevant searches over the social media dataset can be prohibitive thereby limiting processing and understanding of these large and dynamic datasets.

SUMMARY

In an aspect, data characterizing a result set corresponding to a query of a social media dataset can be received. The query can include a first context including a first context identifier. The result set can include a first entity and a second entity. The first entity can include a first entity identifier and the second entity can include a second entity identifier. A key set can include a first fixed length key characterizing the first entity identifier in the first context. The key set can further include a second fixed length key characterizing the second entity identifier in the first context. The key set including the first fixed length key and the second fixed length key can be deduplicated. A first relevance score associated with the first context can be determined using the deduplicated key set including the first fixed length key and the second fixed length key. The first relevance score can be provided.

One or more of the following features can be included in any feasible combination. For example, the first entity identifier can be combined with the first context identifier into the first fixed length key. The second entity identifier can be combined with the first context identifier into the second fixed length key. The first fixed length key and the second fixed length key can be appended into the key set. The combining the first entity identifier with the first context identifier can include hashing the first entity identifier and the first context identifier into the first fixed length key. The combining the second entity identifier with the first context identifier can include hashing the second entity identifier and the first context identifier into the second fixed length key.

The deduplicating of the key set can further include sorting the first fixed length key and the second fixed length key using at least one graphics processing unit. A boundary of a first region of the sorted key set including the first fixed length key and the second fixed length key can be determined. The first region can include a contiguous sequence of a first identical value. The deduplicated key set including the first fixed length key and the second fixed length key can be determined by including a single occurrence of the first identical value.

The first relevance score associated with the first context can be determined. A first size, $S_1$, of the result set of the query can be determined. A first count, $C_1$, of a number of records in the result set of the query including the first context can be determined. A first probability, $P_1$, of the first context in the result set of the query, wherein $$P_1 = \frac{C_1}{S_1},$$

can be determined. A second size, $S_2$, of the social media dataset can be determined. A second count, $C_2$, of a number of records in the social media dataset including the first context can be determined. A second probability, $P_2$, of the first context in the social media dataset, wherein $$P_2 = \frac{C_2}{S_2},$$

can be determined. The first relevance score can be equal to $$(P_1 - P_2) * \left(\frac{P_1}{P_2}\right) * S_1.$$

The first context can include a hashtag, a profile identifier, a user identifier, a theme, an emoji, a site, a uniform resource locator, an organization, a profile gender, a profile profession, a profile location, a set of accounts followed by the profile, a set of words used in posts created by the profile, and/or a set of interests of the profile. The first entity and the second entity can include a hashtag, a profile identifier, a user identifier, a theme, an emoji, a site, a uniform resource locator, and/or an organization. The first fixed length key can include a first unique identifier corresponding to a first combination of the first entity identifier and the first context identifier. The second fixed length key can include a second unique identifier corresponding to a second combination of the second entity identifier and the first context identifier.

The first relevance score can be provided. The first relevance score associated with the first context can be transmitted to a client application. The first context can be provided within a graphical user interface display space of the client application using the first relevance score.

The first entity identifier can be combined with the first context identifier into the first fixed length key. The second entity identifier can be combined with the first context identifier into the second fixed length key. The first fixed length key and the second fixed length key can be appended into the key set. The social media dataset can include a first record stored in a first row and a second record stored in a second row, the first row and the second row can include a first field. The first record can include the first entity and the second record can include the second entity. The first field can include a first property corresponding to the first context. The combining the first entity identifier with the first context identifier can include hashing the first entity identifier and the first context identifier into the first fixed length key. The combining the second entity identifier with the first context identifier can include hashing the second entity identifier and the first context identifier into the second fixed length key.

The deduplicating of the key set can further include sorting the first fixed length key and the second fixed length key using at least one graphics processing unit. A boundary of a first region of the sorted key set including the first fixed length key and the second fixed length key can be determined. The first region can include a contiguous sequence of a first identical value. The deduplicated key set including the first fixed length key and the second fixed length key can be determined by including a single occurrence of the first identical value. The first relevance score can be provided. The first relevance score associated with the first context can be transmitted from a distributed processing cluster.

Data characterizing the query of the social media dataset can be received. The result set including the first entity and the second entity can be determined by executing the query on the social media dataset. A first record associated with the first entity can include the first entity identifier and the first context and a second record associated with the second entity can include the second entity identifier and the first context.

The first entity identifier can be combined with the first context identifier into the first fixed length key. The second entity identifier can be combined with the first context identifier into the second fixed length key. The first fixed length key and the second fixed length key can be appended into the key set. The query can be received by a query proxy. The query can be executed by a distributed processing cluster including a plurality of nodes. The result set of the query can be received by the query proxy. The first entity identifier and the first context identifier can be combined into the first fixed length key using the distributed processing cluster. The second entity identifier and the first context identifier can be combined into the second fixed length key using the distributed processing cluster. The first fixed length key and the second fixed length key can be appended into the key set using the distributed processing cluster. The deduplicated key set including the first fixed length key and the second fixed length key can be deduplicated using at least one graphics processing unit. The first relevance score can be determined using the distributed processing cluster.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 4 is a diagram illustrating an example visual representation of a result set of a query ranked by relevance score.

Like reference symbols in the various drawings indicate like elements.

DETAILED DESCRIPTION

Datasets, such as those relating to social media, can include billions of entities. Because of the scale and growth of the datasets, it can be challenging to quickly (e.g., on the order of seconds or less) find entities in the datasets that are relevant to a query. And it can be difficult to determine which entities are over represented in a specific query versus their representation across the entire social media dataset. Finding entities relevant to a query can include relevance scoring by entity volume, or counting the greatest number of entities returned by a query. But determining relevance by using entity volume may not result in finding the most relevant results. Because the dataset can be noisy (e.g., some entities may be over used in the dataset). And such techniques may not account for the context of the query and/or whether a given entity can be relevant to a specific context. For example, a query can return an entity that is over represented in a given context as relevant because of the number of duplicate entries attributed to that entity, but that entity may not be relevant to the given context.

Some implementations of the current subject matter can determine the relevance of entities in a result set of a query of a social media dataset by removing the noise associated with the result set of the query and determining the relevance of each entity in the denoised result set. To remove the noise from the result set, for example, entities in the result corresponding to a specified context can be aggregated by an entity identifier. Each entity aggregated by entity identifier can be combined with a context identifier associated with the specified context of the query. Each entity aggregated by entity identifier and combined with the context identifier can be hashed into a fixed size key. Each fixed size key can be added to a collection of fixed sized keys. The collection of fixed size keys can be deduplicated using parallel computing on one or more graphics processing unit (GPU). Each fixed size key in the deduplicated collection of fixed size keys can include a unique combination of an entity and a context. Each unique combination of entity and context can be used to determine a relevance score for a respective entity in the specified context.

By combining each entity identifier and context identifier; hashing each combined entity identifier and context identifier into a fixed sized key; and deduplicating the set of fixed size keys on GPUs, noise can be removed from the result set. Further, queries can be executed quickly, accurately, and at scale and an improved query processing system can be realized.

Figure 1:
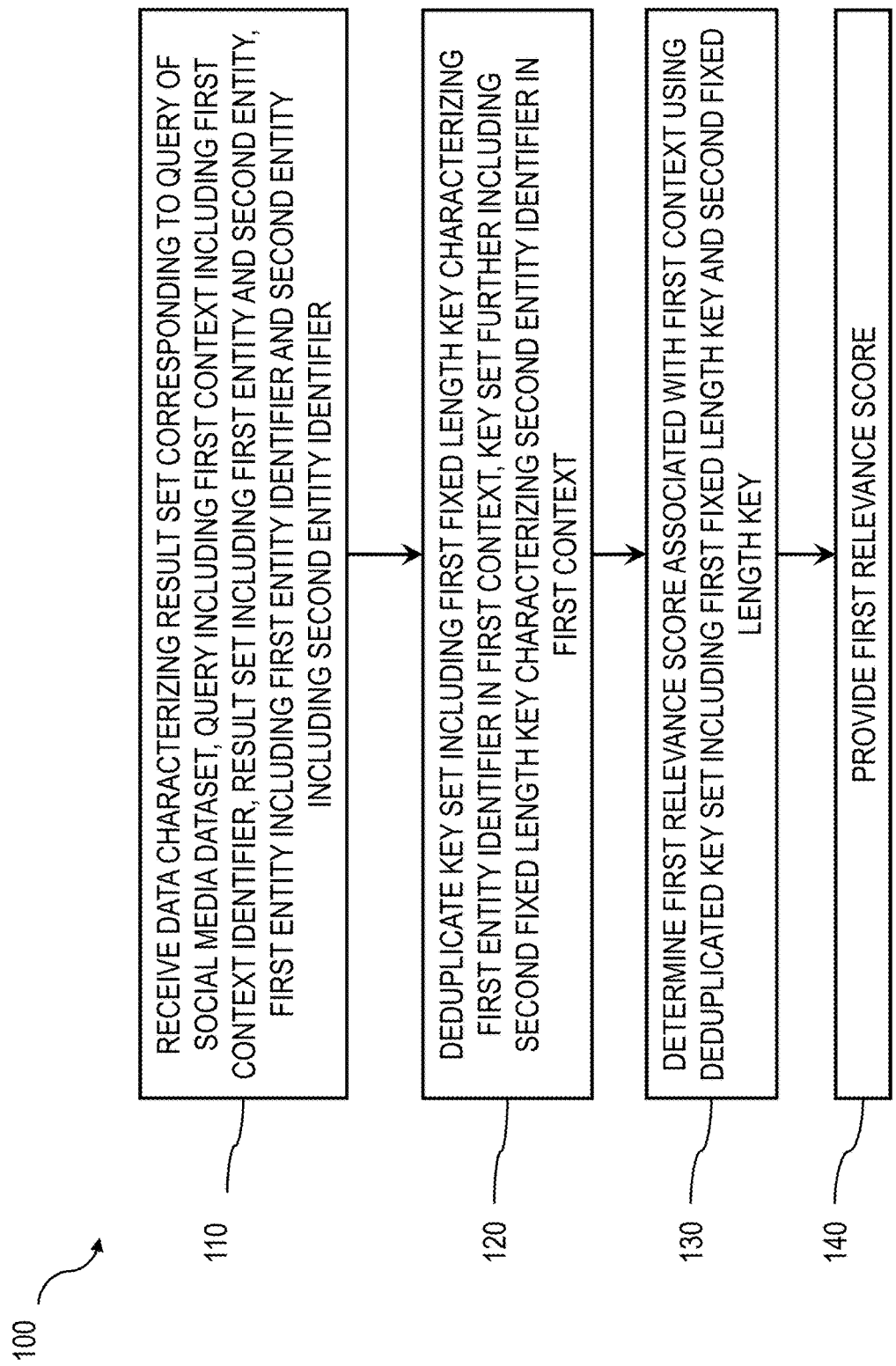
FIG. 1 is a process flow diagram illustrating an example process of determining relevance of entities in a result set of a query of a social media dataset.

FIG. 1 is a process flow diagram illustrating an example process of determining relevance of entities included in a result set of a query of a social media dataset that can perform more accurate determination of relevance on noisy social media datasets. By combining each entity identifier and context identifier; hashing each combined entity identifier and context identifier into a fixed sized key; and deduplicating the set of fixed size keys on GPUs, noise can be removed from the result set. Further, queries can be executed quickly, accurately, and at scale and an improved query processing system can be realized.

At 110, data characterizing a result set can be received. The result set can correspond to a query of a social media dataset. For example, the result set of the query can be refined by a context, such as a first context, including an entity, such as an emoji, hashtag, mention, theme, organization, and/or site. Relevance can be determined using the refined result set of the query. The first context can include a first context identifier uniquely representing the context of the query. The result set can include a first entity and a second entity. An entity can include a record in the social media dataset, such as a tweet, a user profile, and/or the like. The first entity can include a first entity identifier uniquely representing the first entity and the second entity can include a second entity identifier uniquely representing the second entity. For example, the social media dataset can be queried for all social media posts created by a group of social media users. The result set of the query can include the social media posts created by the group of social media users. For example, the social media dataset can be queried for all tweets sent by TWITTER users who follow a specific profile, such as @BBCNews, and the result set of the query can include the tweets sent by users in the follower graph of @BBCNews. In some implementations, the context of the query can include users in the follower graph of @BBCNews. In some implementations, the query can be refined to include tweets in the result set including the hashtag # BBCBizLive. The context of the refined query can include the hashtag # BBCBizLive. The hashtag # BBCBizLive can be uniquely identified with a fixed length unique identifier, such as a first context identifier. A tweet including the hashtag # BBCBizLive can be uniquely identified using a fixed length unique identifier, such as an entity identifier. In some implementations, the refinement of a query can be optional.

At 120, a key set can be deduplicated. The key set can include a first fixed length key characterizing the first entity identifier in the first context. The key set can further include a second fixed length key characterizing the second entity identifier in the first context. In some implementations, the first entity identifier can be combined with the first context identifier into a first fixed length key. In some implementations, the context can be implicit, for example, not explicitly encoded into the first fixed length key. Combining the first entity identifier and the first context identifier can include hashing a data structure including the first entity identifier and the first context identifier. For example, the first entity identifier representing a profile identifier and the first context identifier representing a hashtag identifier can be hashed using a hash function h(x), where x=(first entity identifier, first context identifier). The first fixed length key can include the result of the hash function h(x). The first fixed length key can include a first unique identifier corresponding to a first combination of the first entity identifier and the first context identifier. For example, the first combination can include a tuple, an array, and/or the like. In some implementations, the first fixed length key can include the first entity identifier appended to the first context identifier.

In some implementations, the second entity identifier can be combined with the first context identifier into a second fixed length key. In some implementations, the context can be implicit, for example, not explicitly encoded into the second fixed length key. Combining the second entity identifier and the first context identifier can include hashing a data structuring including the second entity identifier and the first context identifier. For example, the second entity identifier and the first context identifier can be hashed by using a hash function h(x), where x=(second entity identifier, first context identifier). The second fixed length key can include the result of the hash function h(x). The second fixed length key can include a second unique identifier corresponding to a second combination of the second entity identifier and the first context identifier. For example, the second combination can include a tuple, an array, a byte array, and/or the like. In some implementations, the second fixed length key can include the second entity identifier appended to the first context identifier.

In some implementations, the first fixed length key and the second fixed length key can be appended into a collection of fixed length keys, referred to as a key set. For example, the key set can include a data structure configured to facilitate an append operation, such as a queue. An append operation append(x, data structure) can include adding a new element x to the end of data structure. For example, appending 3 to the data structure [1, 2, 3] can result in the data structure [1, 2, 3, 3]. After appending the first fixed length key and the second fixed length key to the key set, the resulting key set can include, for example,
[previous elements of key set, first fixed length key, second fixed length key].

In some implementations, the key set including the first fixed length key and the second fixed length key can be deduplicated. The deduplicating can include sorting the key set including the fixed length keys using a GPU. For example, the fixed keys in the key set can be sorted in ascending order, descending order, by an ordering metric, and/or the like. For example, the key set [5,2,1] can be sorted by ascending order into [1,2,5]. Using a GPU, the sorted key set can be scanned to determine a boundary of a first region. The first region can include a contiguous sequence of a first identical value. For example, a sorted key set can include [1, 2, 2, 2, 4, 5, 6, 6]. The first identical value can include the value 2, the first region can include the contiguous sequence [2,2,2], and the boundary can separate the first entry (e.g., 1) from the second entry (e.g., 2) and the fourth entry (e.g., 2) from the fifth entry (e.g., 4).

At 130, a first relevance score can be determined. The first relevance score can be associated with the first context. The first relevance score can be determined using the deduplicated key set including the first fixed length key and the second fixed length key. For example, given a deduplicated result set A representing a refined query and a deduplicated result set B representing the global background, for each entity E in A (e.g., representing a specific context), a foreground probability and a background probability can be computed. In some implementations, the foreground probability can include the number of entities E in set A divided by the size of set A (e.g., $$foregroundProbability = \frac{\text{count}(E, A)}{A.\text{size}}).$$

In some implementations, the background probability can include the number of entities E in set B divided by the size of set B (e.g., $$backgroundProbability = \frac{\text{count}(E, B)}{B.\text{size}}).$$

In some implementations, the relevance score of the context represented in the deduplicated result set A can include, for example, $$relevanceScore = (foregroundProbability - backgroundProbability) * \frac{foregroundProbability}{backgroundProbability} * A.size.$$

For example, in a given context, a hashtag of interest can occur 15 times in a refined result set including 30 records and 400 times across a background including 2500 records, such that $foregroundProbability = \frac{15}{30}$, $$backgroundProbability = \frac{400}{2500} \text{ and,}$$

the relevance score $= \left(\frac{1}{2} - \frac{4}{25}\right) * \frac{25}{8} * 30 = \frac{17}{50} * \frac{25}{8} * 30 = 31.875.$ At 140, the first relevance score can be provided. The first relevance score, and associated first entity, can be provided to a client application. For example, the first relevance score can be transmitted to the client application. The client application can receive the first relevance score. The first relevance score can be used to provide the first entity and within a graphical user interface display space of the client application. For example, entities can be ranked by relevance score, the size of a text string corresponding to a name of the entity can depend on the relevance score of the entity, and/or the like. The provided entities and corresponding relevance scores associated with the first context can be displayed in a client application GUI display space. For example, the provided entities can be ranked by respective relevance score and a visual representation of the entity (e.g., the size of a text string corresponding to a name of an entity) can depend on the relevance score of the entity, and/or the like.

Figure 2:
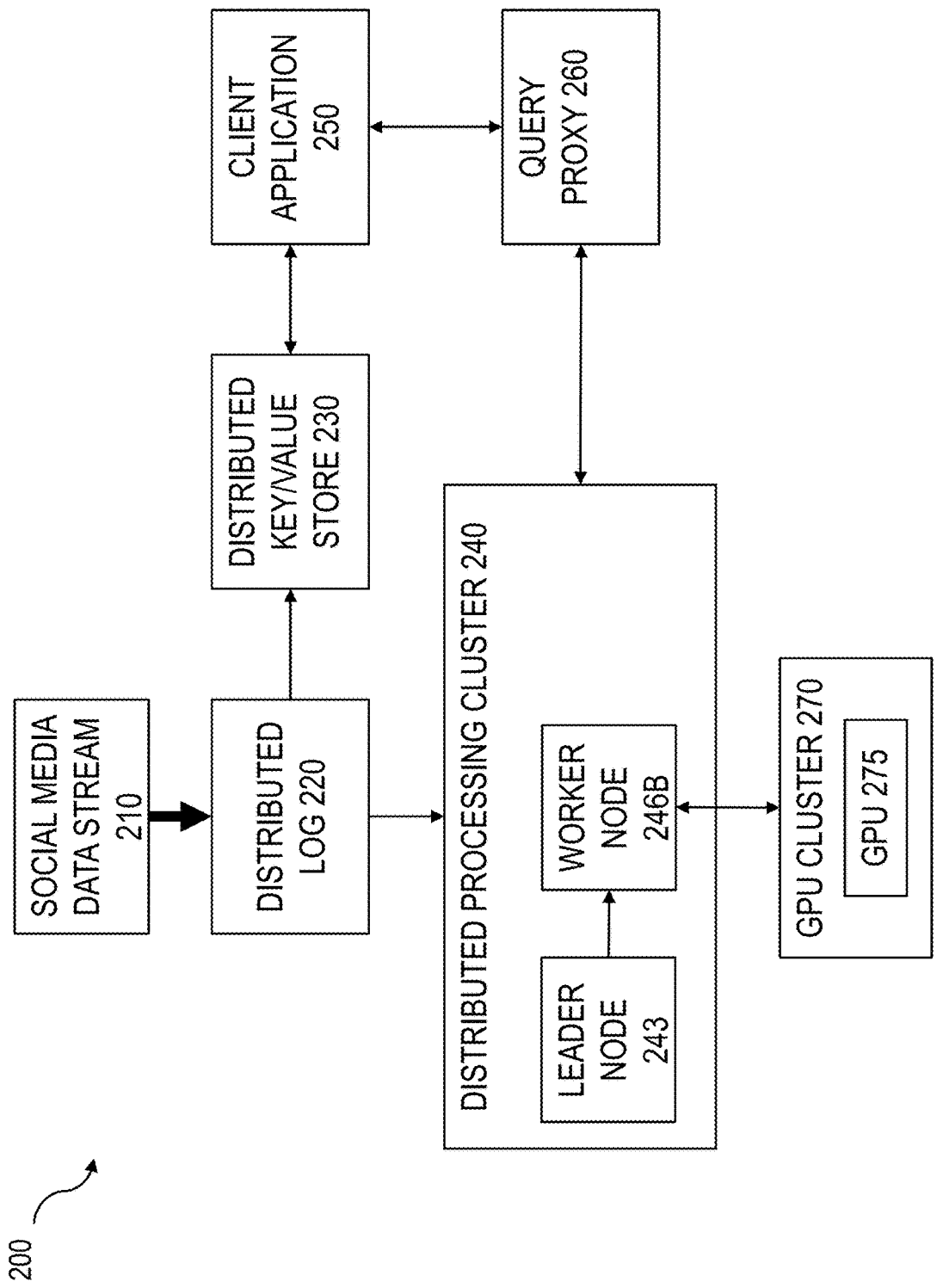
FIG. 2 is a system block diagram illustrating an example system that facilitates determining relevance of entities in a result set of a query of a social media dataset.

FIG. 2 is system block diagram illustrating an example operating environment 200 of a query processing system that can facilitate quick, accurate, and precise queries of a social media dataset in accordance with some implementations of the current subject matter. Operating environment 200 can include social media data stream 210, distributed log 220, distributed key/value store 230, distributed processing cluster 240, client application 250, query proxy 260, and GPU cluster 270. By combining each entity in a result set of a query of a social media dataset with a specified context of the query; hashing each combined entity and context into a fixed sized key; and deduplicating the set of fixed size keys on GPUs, noise can be removed from the result set. Further, queries can be executed quickly, accurately, and at scale and an improved query processing system can be realized.

Social media data stream 210 can include social media data records received from a social media platform. For example, 100,000 social media records can be received through social media data stream 210 every second. The social media data records can include entities. When a social media data record is received, the entity can be assigned a unique identifier, such as an entity identifier. For example, an entity identifier can include a monotonically increasing sequence, referred to as an ordinal. The ordinal can uniquely identify an entity.

A context can include an emoji, a hashtag, a theme, an organization, a site, and/or the like. An emoji can include a graphic symbol visually representing meaning through a resemblance to a physical object. For example, a blushing emoji can visually represent emotional stress, such as candor, embarrassment, anger, and/or the like. A hashtag can include a metadata tag of social media records and can facilitate dynamic, user-generated clustering of social media data records. A hashtag can be included in a social media record by including a hash (e.g., pound sign, #) before a string of characters. For example, the hashtag # hashtag123 can be included in a social media dataset record and can categorize the social media record into a cluster called hashtag123 corresponding to the hashtag. Any social media record including the hashtag # hashtag123 can be included in the cluster hashtag123. A theme can include interests indicated by users of the social the social media platform. For example, a user can be interested in soccer. The user can indicate their interest in soccer and that interest (e.g., soccer) can be included as a theme. An organization can include a social media profile classified as an organization rather than an individual. For example, a social media platform can be classified as an organization via machine learning. A site can include a uniform resource locator (URL). For example, a user can include a URL website.com/example. The site can include a varying degree of relevance to a given query. Other entities can be included in social media data stream 210 and the social media records in social media data stream 210 can be transmitted to distributed log 220.

Distributed log 220, such as APACHE KAFKA, can receive and store social media records. Distributed log 220 can include a sequence of immutable events. An event can include an operation associated with the social media data record. For example, the operation can include creation of the social media data record, update of the social media data record, deletion of social media data record, and/or the like. Each operation associated with the social media data record can include a timestamp value corresponding to a date, time, and/or the like of the execution of the operation.

Distributed log 220 can transmit full social media data records to distributed key/value store 230 for persistence. For example, full social media dataset records can be persisted using distributed key/value store 230, such as CASSANDRA, MONGODB, BIGTABLE, HBASE, COUCHBASE, and/or the like. Distributed key/value store 230 can include data storage using key-value pairs including unique keys. A social media data record can be stored in distributed key/value store 230 with a unique key mapped to the data representation of elements in the social media data record. The unique key, such as a fixed-width unique identifier (e.g., 8 bytes), can be used to store partial records of each social media data record in distributed processing cluster 240.

Distributed processing cluster 240 can store partial social media data records in memory (e.g., memory facilitating greater than or equal to 120 gigabytes/second bandwidth). By storing partial social media dataset records in memory, the records can be accessed quickly, operation (e.g., query) execution can be improved, and the relevance of the queried records can be determined quickly. For example, partial social media dataset records can be represented using rows. Each row can include a record (e.g., social media dataset record), each record can include a field, and/or each field can include a property. Data in a record can be encapsulated in a field. The data encapsulated in the field can include a property. For example, a first row can include a first record. The first record can include a first entity. The first record corresponding to the first entity can be represented by a first row. The first row can include a first field and the first field can include a first property corresponding to the first context. For example, if the first field encapsulates the first context, the first property can include a specific context identifier corresponding to the encapsulated first context.

Distributed processing cluster 240 can include one or more nodes including leader node 243 and worker node 246. Leader node 243 can be designated (e.g., through leader election) and can facilitate coordination of operations performed by worker node 246. Leader node 243 can assign one or more worker node 246 to store social media data records and/or execute queries, aggregations, database operations, and/or the like on the stored social media data records.

A request for an operation, such as a query, can be received from client application 250. The operation can include a context, such as a first context. Client application 250 can include a graphical user interface (GUI) display space. The GUI display space can facilitate user interaction with client application 250, such as specifying a query. And GUI display space can display a visual representation of entities in the result set of the specified query.

Query proxy 260 can facilitate execution of one or more queries. For example, execution of a query can include determining a query execution plan including one or more subquery, coordinating the execution of the one or more subquery, and stitching together the results of the one or more subquery into the result set of the query. The query execution plan can include determining a cost of each subquery (e.g., time cost, space cost, resource cost, and/or the like), determining a total query cost, and/or minimizing the cost of executing the query. In some implementations, execution of a query can include transmitting data characterizing at least a portion of social media data records to a cluster of graphics processing units (GPU).

GPU cluster 270 can include one or more GPU 275. In some implementations, each worker node 246 can include GPU cluster 270. For example, GPU 275 in GPU cluster 270 can utilize compute unified device architecture (CUDA) with algorithms optimized for parallel operations to execute operations on data received by GPU 275. For example, GPU 275 can perform deduplication operations, such as sorting, compression (e.g., identifying boundaries of contiguous sequences of unique values and including a single instance of a unique value from the contiguous sequence using the boundaries for fast lookup), and/or the like.

Figure 3:
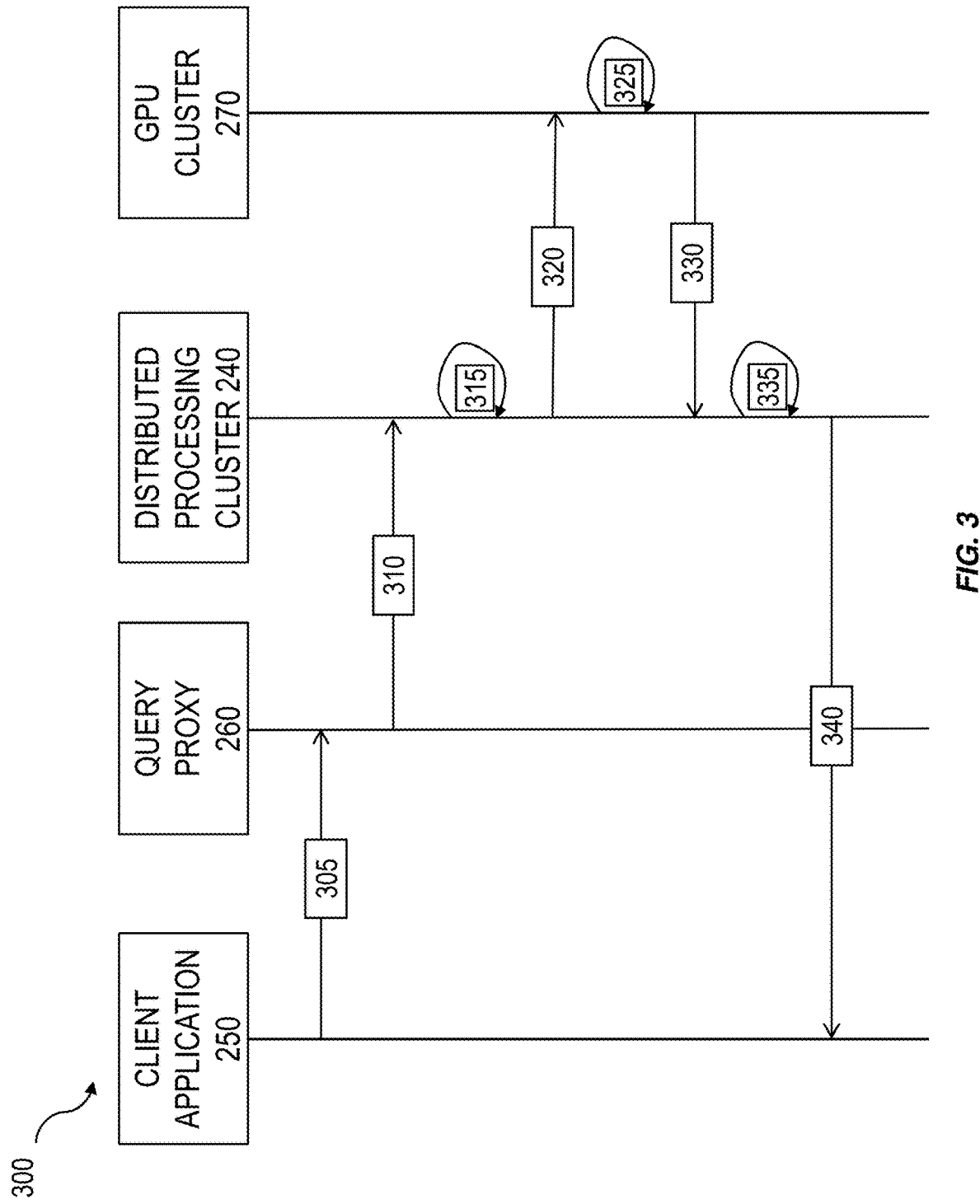
FIG. 3 is a data flow diagram illustrating an example data communication flow when determining relevance of entities in a result set of a query of a social media dataset.

FIG. 3 is a data flow diagram illustrating an example data communication flow 300 when determining relevance of entities in a result set of a query of a social media dataset. By combining each entity in a result set of a query of a social media dataset with a specified context of the query; hashing each combined entity and context into a fixed sized key; and deduplicating the set of fixed size keys on GPUs, noise can be removed from the result set. Further, queries can be executed quickly, accurately, and at scale and an improved query processing system can be realized.

At 305, data characterizing a selection of a context from a result set of a query of a social media dataset, such as a first context including a first context identifier, can be transmitted from client application 250 and received by query proxy 260. In some implementations, query proxy 260 can determine a query execution plan to execute a query of the social media dataset for entities including the first context. The query execution plan can include one or more subqueries for querying the social media dataset for entities including the first context.

At 310, data characterizing one or more subqueries for querying the social media dataset for entities including the first context can be transmitted from query proxy 260 and received by distributed processing cluster 240. Each subquery of the one or more subqueries can be executed by one or more nodes of distributed processing cluster 240. Each subquery can return a result set including entities. Each entity can include the first context.

At 315, distributed processing cluster 240 can aggregate the entities by entity identifier. For example, the result set can include a first entity and a second entity. The first entity can include a first entity identifier and the second entity can include a second entity identifier. Aggregating the entities by entity identifier can include appending respective entity identifiers to a data structure representing the respective entities corresponding to the first context. For example, the first entity identifier can be appended to the data structure and the second entity identifier can be appended to the data structure. The entities aggregated by entity identifier can be combined with the first context identifier. For example, the entities can be aggregated in a byte array. The first four bytes (e.g., bytes 0, 1, 2, and 3) of each element of the byte array can include the entity identifier and a second four bytes (e.g., bytes 4, 5, 6, and 7) of each element of the byte array can include the context identifier. Each element of the byte array (e.g., corresponding to a combination of an entity identifier and a context identifier associated with an entity and a context, respectively) can be hashed into a fixed length key. For example, the fixed length key can be 8 bytes long. Each fixed length key can be appended to a key set.

At 320, data characterizing the key set can be transmitted from distributed processing cluster 240 and received by GPU cluster 270. At 325, the key set can be deduplicated in parallel by GPU 275 in GPU cluster 270. The deduplicating can include sorting the key set, identifying a boundary of contiguous sequences of repeating values, and/or including a single occurrence of each repeating value in the deduplicated key set. In some implementations, a filtered set can be instantiated, and single occurrences of each repeating value can be appended to the filtered set.

At 330, data characterizing the deduplicated set can be transmitted from GPU cluster 270 and received by distributed processing cluster 240. At 335, distributed processing cluster 240 can compute a relevance score for each context. Distributed processing cluster 240 can look up the entities corresponding to the keys in the deduplicated key set (e.g., first entity corresponding to first fixed length key, second entity corresponding to second fixed length key, and/or the like). The entities corresponding to the keys in the deduplicated key set can be associated with the relevance score calculated for the context (e.g., first entity, second entity, and/or the like).

At 340, data characterizing the relevance score for a given context and the entities corresponding to the context can be transmitted by distributed processing cluster 240 to client application 250. The relevance score can be used to, for example, provide the entities to a user within a graphical user interface display space of client application 250. For example, multiple contexts (e.g., entities corresponding to a first context, a second context, and/or the like) can be ranked by relevance score, the size of a text string corresponding to a name of the entity can depend on the relevance score of the entity, and/or the like. The provided entities and corresponding relevance scores associated with the first context can be displayed in a client application GUI display space. In some implementations, the relevance scores can be used to trigger alerts.

FIG. 4 is a diagram illustrating an example visual representation 400 of a result set of a query ranked by relevance score. Visual representation 400 can include entity type 410, sort by type 420, name field 430, description field 440, relevance score field 450, entity volume field 460, and entities 470A-F including a name, a description, a relevance score, and a volume. Visual representation 400 can be displayed in client application 250 GUI display space. By combining each entity in a result set of a query of a social media dataset with a specified context of the query; hashing each combined entity and context into a fixed sized key; and deduplicating the set of fixed size keys on GPUs, noise can be removed from the result set and a relevance score for each entity in the given context can be determined. Further, queries can be executed quickly, accurately, and at scale and an improved query processing system can be realized. Furthermore, an improved GUI can be provided.

Figure 5:
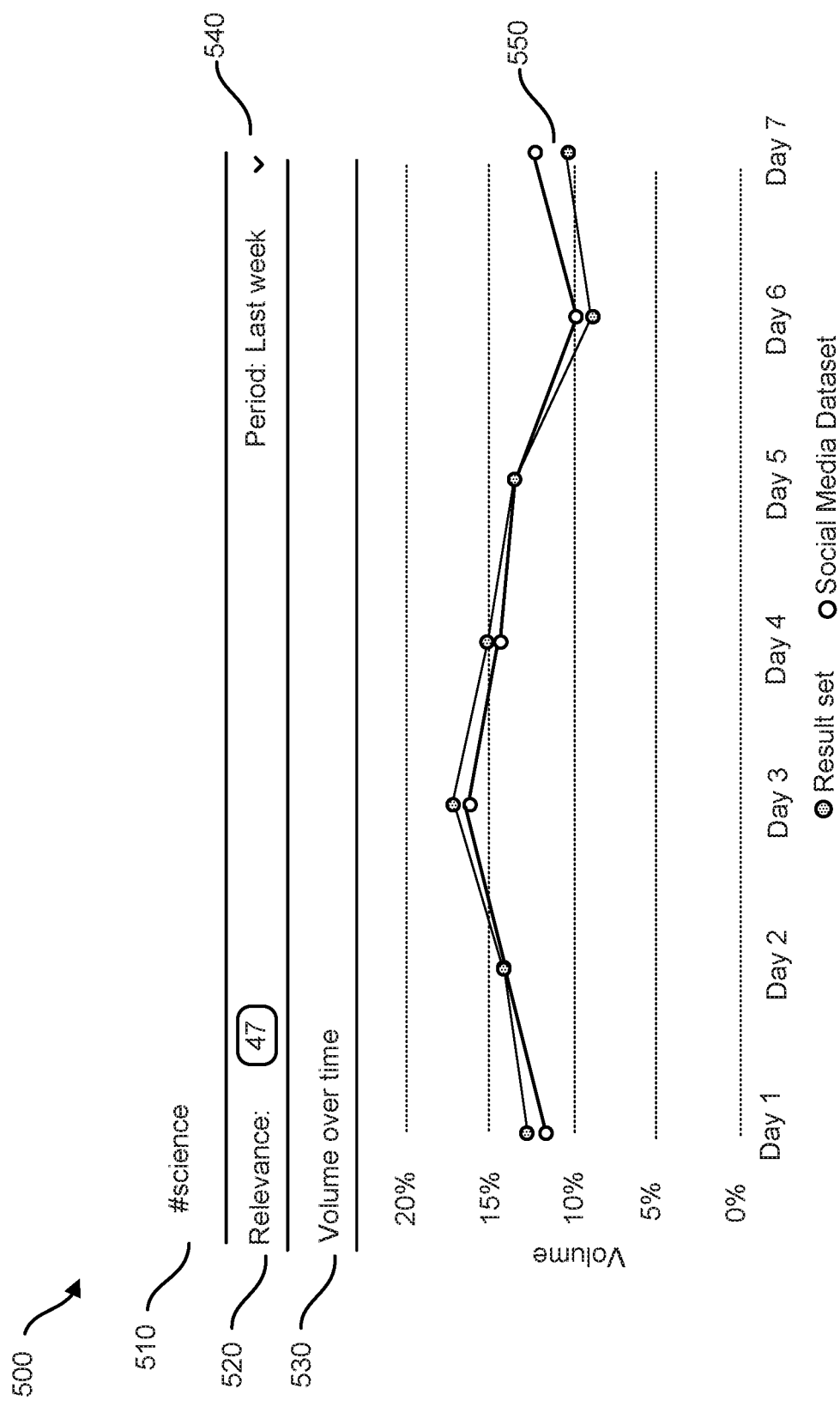
FIG. 5 is a diagram illustrating an example visual representation of a volume of an entity in a result set of a query versus a volume of an entity in a social media dataset over a period of time.

FIG. 5 is a diagram illustrating an example visual representation 500 of a volume of an entity in a result set of a query versus a volume of an entity in a social media dataset over a period of time. Visual representation 500 can include entity name 510, entity relevance score 520, description 530, time period 540, and comparison chart 550. Description 530 can include a description of information included in comparison chart 550. For example, visual representation 500 can include comparison chart 550 comparing the representation of entity hashtag # science in a result set of a query versus a social media dataset over a period of a week (e.g., 7 days). Comparison chart 550 can include the volume of entity hashtag # science in the result set versus in the social media dataset on each day over the time period. Visual representation 500 can be displayed in client application 250 GUI display space. By combining each entity in a result set of a query of a social media dataset with a specified context of the query; hashing each combined entity and context into a fixed sized key; and deduplicating the set of fixed size keys on GPUs, noise can be removed from the result set and a relevance score for each entity in the given context can be determined. Further, queries can be executed quickly, accurately, and at scale and an improved query processing system can be realized. Furthermore, an improved GUI can be provided.

Although a few variations have been described in detail above, other modifications or additions are possible. For example, in some implementations, a query can be executed. The executed query can find social media profiles matching some criteria. The profiles returned in the result set of the query can be refined (e.g., by joining the profiles in the result set to an entity, such as an entity) and the refined result set can include a context (e.g., the entity utilized to refine the result set of the original query).

The subject matter described herein provides many technical advantages. For example, query execution time over a large social media dataset can be decreased (e.g., execution of a query over a social media dataset including billions of entries in less than 5 seconds). Result sets of a query of a large social media dataset can be improved with entities corresponding more accurately and precisely to entities desired by an executed query. The result set of a query can more accurately and precisely include entities relevant to the context of the query. Faster query execution time, accurate query results, and precise query results can provide an improved query processing system. Destructive and/or undesirable user behavior (e.g., spamming) can be filtered out.

Large and dynamic social network data sets can include noise. Removing noise from the dataset efficiently and/or at scale by using an associative data structure, such as a collection of key/value pairs, can be undesirable. Because of the size of large and dynamic social media datasets, the size of the data structure can exceed central processing unit data cache sizes and exceeding data cache sizes can result in expensive cache miss overhead and/or random reads from main memory. And because associative data structures can require expensive locking and/or synchronization overhead, making them undesirable for use in parallel computing. Without using parallel computing, removing noise from large and dynamic social network datasets can be impractically computationally expensive.

Some implementations of the current subject matter can efficiently remove noise from large and dynamic social network datasets by using large streaming reads and writes. Using large streaming reads and writes can maximize cache efficiency. And large streaming reads and writes can be desirable for use in parallel computing because locking and/or synchronization operations can be avoided. As such, some implementations of the current subject matter can provide for improved execution of operations on large and dynamic datasets, such as improved execution of queries. Improved execution of operations on large and dynamic datasets can provide for an improved computing system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    receiving data characterizing a result set corresponding to a query of a social media dataset, the query including a first context including a first context identifier, the result set including a first entity and a second entity, the first entity including a first entity identifier and the second entity including a second entity identifier;
    deduplicating a key set including a first fixed length key characterizing the first entity identifier in the first context, the key set further including a second fixed length key characterizing the second entity identifier in the first context, wherein the first fixed length key is a first unique identifier corresponding to a first combination of the first entity identifier and the first context identifier, and the second fixed length key is a second unique identifier corresponding to a second combination of the second entity identifier and the first context identifier;
    determining a first relevance score associated with the first context using the deduplicated key set including the first fixed length key and the second fixed length key; and
    providing the first relevance score.

2. The method of claim 1, further comprising:
    combining the first entity identifier with the first context identifier into the first fixed length key;
    combining the second entity identifier with the first context identifier into the second fixed length key; and
    appending the first fixed length key and the second fixed length key into the key set.

3. The method of claim 2, wherein the combining the first entity identifier with the first context identifier includes hashing the first entity identifier and the first context identifier into the first fixed length key; and
    wherein the combining the second entity identifier with the first context identifier includes hashing the second entity identifier and the first context identifier into the second fixed length key.

4. The method of claim 1, wherein the deduplicating further comprises:
    sorting, using at least one graphics processing unit, the key set including the first fixed length key and the second fixed length key.

5. The method of claim 4, wherein the deduplicating further comprises:
    determining, using the at least one graphics processing unit, a boundary of a first region of the sorted key set including the first fixed length key and the second fixed length key, the first region including a contiguous sequence of a first identical value; and
    determining the deduplicated key set including the first fixed length key and the second fixed length key by including a single occurrence of the first identical value.

6. The method of claim 1, wherein the determining the first relevance score associated with the first context further comprises:
    determining a first size, $S_1$, of the result set of the query;
    determining a first count, $C_1$, of a number of records in the result set of the query including the first context;
    determining a first probability, $P_1$, of the first context in the result set of the query, wherein $$P_1 = \frac{C_1}{S_1},$$

determining a second size, $S_2$, of the social media dataset;
    determining a second count, $C_2$, of a number of records in the social media dataset including the first context;

determining a second probability, $P_2$, of the first context in the social media dataset, wherein $$P_2 = \frac{C_2}{S_2};$$

wherein the first relevance score is equal to $$(P_1 - P_2) * \left(\frac{P_1}{P_2}\right) * S_1.$$

7. The method of claim 1, wherein the first context includes a hashtag, a profile identifier, a user identifier, a theme, an emoji, a site, a uniform resource locator, an organization, a profile gender, a profile profession, a profile location, a set of accounts followed by the profile, a set of words used in posts created by the profile, and/or a set of interests of the profile.

8. The method of claim 1, wherein the first entity and the second entity include a hashtag, a profile identifier, a user identifier, a theme, an emoji, a site, a uniform resource locator, and/or an organization.

9. The method of claim 1, wherein the providing further comprises:
transmitting, to a client application, the first relevance score associated with the first context; and
providing, within a graphical user interface display space of the client application and using the first relevance score, the first context.

10. The method of claim 1, further comprising:
combining the first entity identifier with the first context identifier into the first fixed length key;
combining the second entity identifier with the first context identifier into the second fixed length key; and
appending the first fixed length key and the second fixed length key into the key set;
wherein the social media dataset includes a first record stored in a first row and a second record stored in a second row, the first row and the second row including a first field;
wherein the first record includes the first entity and the second record includes the second entity;
wherein the first field includes a first property corresponding to the first context;
wherein the combining the first entity identifier with the first context identifier includes hashing the first entity identifier and the first context identifier into the first fixed length key;
wherein the combining the second entity identifier with the first context identifier includes hashing the second entity identifier and the first context identifier into the second fixed length key;
wherein the deduplicating further comprises:
sorting, using at least one graphics processing unit, the key set including the first fixed length key and the second fixed length key;
determining, using the at least one graphics processing unit, a boundary between a first region of the sorted key set including the first fixed length key and the second fixed length key, the first region including a contiguous sequence of a first identical value; and
determining the deduplicated key set including the first fixed length key and the second fixed length key by including a single occurrence of the first identical value; and wherein the providing further comprises:
transmitting, from a distributed processing cluster, the first relevance score associated with the first context.

11. The method of claim 1, wherein the query further comprises:
receiving data characterizing the query of the social media dataset; and
determining the result set including the first entity and the second entity by executing the query on the social media dataset;
wherein a first record associated with the first entity includes the first entity identifier and the first context and a second record associated with the second entity includes the second entity identifier and the first context.

12. The method of claim 1, further comprising:
combining the first entity identifier with the first context identifier into the first fixed length key;
combining the second entity identifier with the first context identifier into the second fixed length key;
appending the first fixed length key and the second fixed length key into the key set;
receiving, by a query proxy, the query; and
executing, using a distributed processing cluster including a plurality of nodes, the query;
wherein the result set of the query is received by the query proxy;
wherein the first entity identifier and the first context identifier are combined into the first fixed length key using the distributed processing cluster;
wherein the second entity identifier and the first context identifier are combined into the second fixed length key using the distributed processing cluster;
wherein the first fixed length key and the second fixed length key are appended into the key set using the distributed processing cluster;
wherein the deduplicated key set including the first fixed length key and the second fixed length key is deduplicated using at least one graphics processing unit;
wherein the first relevance score is determined using the distributed processing cluster.

13. The method of claim 1, wherein the first relevance score is based on a first probability of the first context in the result set of the query, a second probability of the first context in the social media dataset, and a first size of the result set of the query.

14. A system comprising:
at least one data processor;
memory storing instructions which, when executed by the at least one data processor, causes the at least one data processor to perform operations comprising:
receiving data characterizing a result set corresponding to a query of a social media dataset, the query including a first context including a first context identifier, the result set including a first entity and a second entity, the first entity including a first entity identifier and the second entity including a second entity identifier;
deduplicating a key set including a first fixed length key characterizing the first entity identifier in the first context, the key set further including a second fixed length key characterizing the second entity identifier in the first context, wherein the first fixed length key is a first unique identifier corresponding to a first combination of the first entity identifier and the first context identifier, and the second fixed length key is a second unique identifier corresponding to a second combination of the second entity identifier and the first context identifier;

determining a first relevance score associated with the first context using the deduplicated key set including the first fixed length key and the second fixed length key; and providing the first relevance score.

15. The system of claim 14, wherein the operations performed by the at least one data processor further include:

combining the first entity identifier with the first context identifier into the first fixed length key;

combining the second entity identifier with the first context identifier into the second fixed length key; and appending the first fixed length key and the second fixed length key into the key set.

16. The system of claim 15, wherein the combining the first entity identifier with the first context identifier includes hashing the first entity identifier and the first context identifier into the first fixed length key; and wherein the combining the second entity identifier with the first context identifier includes hashing the second entity identifier and the first context identifier into the second fixed length key.

17. The system of claim 14, wherein the deduplicating further comprises:

sorting, using at least one graphics processing unit, the key set including the first fixed length key and the second fixed length key.

18. The system of claim 17, wherein the deduplicating further comprises:

determining, using the at least one graphics processing unit, a boundary of a first region of the sorted key set including the first fixed length key and the second fixed length key, the first region including a contiguous sequence of a first identical value; and determining the deduplicated key set including the first fixed length key and the second fixed length key by including a single occurrence of the first identical value.

19. The system of claim 14, wherein the determining the first relevance score associated with the first context further comprises:

determining a first size, $S_1$, of the result set of the query;

determining a first count, $C_1$, of a number of records in the result set of the query including the first context;

determining a first probability, $P_1$, of the first context in the result set of the query, wherein $$P_1 = \frac{C_1}{S_1},$$

determining a second size, $S_2$, of the social media dataset;

determining a second count, $C_2$, of a number of records in the social media dataset including the first context;

determining a second probability, $P_2$, of the first context in the social media dataset, wherein $$P_2 = \frac{C_2}{S_2};$$

wherein the first relevance score is equal to $$(P_1 - P_2) * \left(\frac{P_1}{P_2}\right) * S_1.$$

20. A non-transitory computer readable storage medium storing instructions, which when executed by at least one data processor of at least one computing system, implement operations comprising:

receiving data characterizing a result set corresponding to a query of a social media dataset, the query including a first context including a first context identifier, the result set including a first entity and a second entity, the first entity including a first entity identifier and the second entity including a second entity identifier;

deduplicating a key set including a first fixed length key characterizing the first entity identifier in the first context, the key set further including a second fixed length key characterizing the second entity identifier in the first context, wherein the first fixed length key is a first unique identifier corresponding to a first combination of the first entity identifier and the first context identifier, and the second fixed length key is a second unique identifier corresponding to a second combination of the second entity identifier and the first context identifier;

determining a first relevance score associated with the first context using the deduplicated key set including the first fixed length key and the second fixed length key; and providing the first relevance score.

* * * * *